(12) United States Patent
Calvert

(10) Patent No.: US 7,048,847 B2
(45) Date of Patent: May 23, 2006

(54) SETTLING AIDS FOR SOLIDS IN HYDROCARBONS

(75) Inventor: Nancy R. Calvert, Kingwood, TX (US)

(73) Assignee: General Electric Company, Schenectady, NY (US)

( * ) Notice: Subject to any disclaimer, the term of this patent is extended or adjusted under 35 U.S.C. 154(b) by 420 days.

(21) Appl. No.: 10/357,239

(22) Filed: Feb. 3, 2003

(65) Prior Publication Data

US 2004/0152937 A1    Aug. 5, 2004

(51) Int. Cl.
*C10C 7/10* (2006.01)
*C10C 7/17* (2006.01)
*C10G 17/00* (2006.01)

(52) U.S. Cl. .................. 208/251 R; 208/290; 585/833; 585/860; 585/862; 585/864; 585/866

(58) Field of Classification Search ............ 208/251 R; 585/833, 860, 862, 864, 866
See application file for complete search history.

(56) References Cited

U.S. PATENT DOCUMENTS

| 5,366,637 | A | 11/1994 | Turunc |
| 5,474,713 | A | 12/1995 | Faber |
| 5,476,988 | A | 12/1995 | Hart et al. |
| 5,481,059 | A | 1/1996 | Brock et al. |
| 5,593,572 | A | 1/1997 | Hart |
| 5,681,451 | A | 10/1997 | Hart |
| 6,030,467 | A | 2/2000 | Leser et al. |

*Primary Examiner*—Tam M. Nguyen
(74) *Attorney, Agent, or Firm*—Duane Morris LLP

(57) ABSTRACT

A treatment for accelerating the settling of finely divided solids in hydrocarbon fluids, including adding to the hydrocarbon a sufficient settling amount of a combination of (a) a polyacrylic acid adducted alkylphenol-formaldehyde resin alkoxylate compound, and (b) an alkylphenol-formaldehyde resin alkoxylate having a molecular weight of about 500 to about 5,000.

12 Claims, No Drawings

SETTLING AIDS FOR SOLIDS IN HYDROCARBONS

FIELD OF THE INVENTION

The present invention relates to treatments for accelerating settling of solids in hydrocarbon fluids. The treatments of the present invention are particularly effective at accelerating the settling of FCC catalyst fines in an oil slurry.

BACKGROUND OF THE INVENTION

Unrefined hydrocarbons such as crude oil, resids and bottom streams often contain finely divided solid matter, which often must be removed prior to further use or processing. These solids can include solids of a soil-like nature, finely divided silicas, clays, silt and coke, and metal oxide and sulfide corrosion solids. These solids may also include traces of metal particles such as lead, nickel, chromium and the like, and salts thereof.

For instance, fluid catalytic cracker (FCC) units use a fluidized bed of zeolite type aluminosilicate clay particles to crack heavy petroleum fractions into lighter fractions at elevated temperatures. The catalyst is eventually deactivated by poisoning or coking. These spent fines must be removed from the FCC on a continual basis so that slurry containing fresh catalyst can be added.

Some of this slurry oil containing the spent fines is then typically settled in tankage, though hydrocyclones are sometimes used to accelerate the separation process. Both native and synthetic components of the slurry oil have a dispersant effect which retards the settling of the fines.

The present inventor has discovered that a combination of certain chemical agents, when added to the slurry oil, have an anti-dispersant or coagulant effect which accelerates the settling process. This produces a cleaner decant oil (typically <0.05 wt % ash) in a shorter period of time, and can then be sold as carbon black feedstock or residual fuel oil.

DETAILED DESCRIPTION OF THE INVENTION

The present invention relates to compositions and methods for accelerating the settling of finely divided solids in hydrocarbon fluids, the methods comprising adding to said hydrocarbons an effective settling amount of a combination of (a) an adduct of polyacrylic acid and an alkylphenol-formaldehyde resin alkoxylate and (b) an alkylphenol-formaldehyde resin alkoxylate.

As to the first component of the combination, the settling aids are adducts of low molecular weight (MW=1000 to 2000) polyacrylic acid and an alkylphenol-formaldehyde resin alkoxylate. Preferred adducts are nonylphenolic resin propoxyethoxylate adducts such as those available from Arjay as AB-455 and Witco as DRI-9037.

The polyacrylic acid adducted alkylphenol-formaldehyde resin alkoxylates prove effective in a variety of hydrocarbon fluids. These hydrocarbon fluids are generally unrefined hydrocarbons that are prone to containing finely divided solids. These hydrocarbon fluids include but are not limited to crude oils, resids, bottom streams, vacuum bottoms, heavy ends and the like. Additional details regarding this component of the present invention are found in U.S. Pat. No. 5,481,059, herein incorporated by reference.

As to the alkylphenol-formaldehyde resin alkoxylate component of the present invention, such materials generally have molecular weights in the range of from about 500 to about 5,000, with a range of about 1,000 to about 2,500 preferred. The alkyl groups may be linear or branched, and have from about 1 to about 24 carbon atoms, with a range of from about 4 to about 9 preferred. The alkoxy group has about 2 to about 4 carbon atoms, with 2 preferred; the alkoxylation comprises about 20 to 80 percent by weight of the molecule, with about 50 percent preferred. Additional details regarding this component of the present invention are found in U.S. Pat. No. 5,681,451, also herein incorporated by reference.

DESCRIPTION OF THE PREFERRED EMBODIMENTS

The present invention relates to a chemical treatment to settle solids in a liquid matrix. The liquid matrix may be either organic, or a mix of organic and aqueous matrices. The chemicals used to settle solids are a combination of (a) an adduct of polyacrylic acid and an alkylphenol-formaldehyde resin alkoxylate (Category A) and (b) an alkylphenol-formaldehyde resin alkoxylate (Category B).

In the testing of the present invention, solids settling efficiency was determined by bottle testing. The process fluid was heated before mixing; after appropriate mixing to homogenize the fluid, 100 ml was poured into 150 ml glass bottles.

The starting chemical solution for treatment dosage was comprised of 20% total raw materials in highly aromatic naphtha (HAN). The fluids were dosed with each chemical and then with the blends of chemicals. A blank and a control were tested in each run. The blank had no added solvent or additive. The control sample was dosed with the appropriate amount of the solvent to mimic solvent addition in additized tested fluids. The samples were mixed by automatic shaker for 3 minutes on high (3–5 strokes/sec; 5 inch strokes). After mixing was complete, the samples were placed in a hot bath. The temperature and residence time was representative of the field conditions.

After this predetermined residence time in the hot bath, the samples had the top 50% of the sample withdrawn for solids amount determination. Some of the fluids tested were easily filtered, while others were not. Therefore, the solids in the top of 50% and bottom 50% of the processed fluids were determined by one of two methods, filtration or % ash method. The fluids that were not easily filtered were determined by ASTM Method D482-87. The percent ash was given as wt/wt percent. The fluids that were easily filtered were done so with a Gelman A/E glass fiber filter. The filters were preweighed and placed in appropriately labeled tins. The top 50% of processed fluid was filtered, and the filter-funnel rinsed out with appropriate solvent. The bottom 50% of processed fluid was filtered and the glass container was rinsed with solvent into the funnel to remove all bottom traces of solids. The filter-funnel was rinsed and the filter paper removed. The filter papers were then placed in a furnace at 900° F. for approximately 9 hours. The results of this test were recorded as percent of inorganic solids remaining in the top 50% of sample processed.

The following tables indicate the effectiveness of the combined tested chemicals of the present invention in various hydrocarbon and aqueous mixed streams, and in hydrocarbon streams.

TABLE I

Solid settling results in a mixed stream with relatively high
solids percentage
Fluid processed: Mixed Stream of Hydrocarbon & Water, having
relatively high solids content

| Treatment: | Blank | 300 ppm Cat A | 600 ppm Cat A | 300 ppm Cat B | 600 ppm Cat B | 300 ppm Total Cat A + B (150 ppm each) | 600 ppm Total Cat A + B (300 ppm each) |
|---|---|---|---|---|---|---|---|
| % ash left in top 50% of sample | 9.00% | 9.00% | 1.12% | 2.02% | 2.36% | 0.96% | 5.80% |

The above results indicate that a treatment as high as 600 ppm of Cat A is needed to achieve similar settling results as the 300 ppm combination (150 ppm each of Cat A & B).

At the 300 & 600 ppm dosages, Cat B, by itself, could only reduce solids to about 2%, while 300 ppm of the combination chemistry (150 ppm each of Cat A & B) reduced the mineral content to about 1%.

Dispersion, a sign of overtreatment, occurred at 600 ppm of the combined chemistries of Cat A+B.

Solid settling results in a hydrocarbon stream containing
a medium amount of solids.
Process fluid: Hydrocarbon stream with medium
amount of solids to settle

| Treatment: | Blank | 50 ppm Cat A | 200 ppm Cat A | 300 ppm Cat A | 600 ppm Cat A | 50 ppm Cat B | 200 ppm Cat B | 300 ppm Cat B | 50 ppm total Cat A + B (25 ppm each) | 200 ppm total Cat A + B (100 ppm each) | 300 ppm total Cat A + B (150 ppm each) |
|---|---|---|---|---|---|---|---|---|---|---|---|
| % inorganics remaining in top 50% of sample | 1.29% | 1.04% | 0.81% | 0.48% | 0.18% | 1.20% | 0.90% | 0.90% | 0.40% | 0.24% | 0.16% |

As shown above, Cat A chemistry needed significantly more treatment to match combination results, i.e., 600 ppm to match the 300 ppm Cat A+B and 300 ppm to match the 50 ppm Cat A+B treatment.

At dosages of 50–300 ppm, Cat B chemistry results were significantly below the blend of Cat A+B at just 50 ppm.

TABLE III

Solid settling results in a combined (light and heavy) gas-oil stream
with relatively low total solids
Fluid processed: Combined Gas-oil stream with
relatively low amount of solids

| Treatment | Dosage | % Ash remaining in top 50% of sample |
|---|---|---|
| Cat A + B (50 ppm each) | 100 ppm | 0.0108 |
| Cat A | 100 ppm | 0.0122 |
| Cat B | 100 ppm | 0.0186 |
| Control | 100 ppm - Solvent only | 0.0264 |
| Blank | 0 | 0.0318 |

What is claimed is:

1. A method for accelerating the settling of finely divided oil and water insoluble solids in hydrocarbon fluids comprising adding to said hydrocarbon fluids an effective settling amount of a combination of
   (a) an adduct of polyacrylic acid and an alkylphenol-formaldehyde resin alkoxylate and
   (b) an alkylphenol-formaldehyde resin alkoxylate, wherein the ratio of (a):(b), in parts per million, is about 1:1.

2. The method as recited in claim 1 wherein said polyacrylic acid adduct is a nonylphenol-formaldehyde resin propoxyethoxylate.

3. The method as recited in claim 1 wherein said finely divided solids are fluid catalytic cracker catalyst fines.

4. The method as recited in claim 1 wherein said hydrocarbon is a fluid catalytic cracker slurry.

5. The method as recited in claim 1 wherein said hydrocarbon is selected from the group consisting of crude oils and fractions or residuals of crude oils boiling over about 400° F.

6. The method as recited in claim 1 wherein said alkylphenol-formaldehyde resin alkoxylate has a molecular weight range of about 500 to about 5,000.

7. The method as recited in claim 1 wherein said alkylphenol-formaldehyde resin alkoxylate has a molecular weight range of about 1,000 to about 2,500.

8. The method as recited in claim 1 wherein said alkylphenol-formaldehyde resin alkoxylate has an alkyl group range of 1 to about 24 carbon atoms.

9. The method as recited in claim 1 wherein said alkylphenol-formaldehyde resin alkoxylate has alkoxy groups ranging from about 2 to about 4 carbon atoms each.

10. The method as recited in claim 1 wherein said alkoxylation comprises 20 to 80% of the weight of said alkylphenol-formaldehyde resin alkoxylate.

11. The method as recited in claim 1 wherein said alkylphenol-formaldehyde resin alkoxylate is a base catalyzed nonylphenolic resin ethoxylate wherein the ethoxylation comprises about 50% of the weight of said ethoxylate.

12. The method as recited in claim 1 wherein said combination is added to said hydrocarbon in an amount ranging from about 1 part to about 1000 parts per million parts of hydrocarbon.

* * * * *